US005591074A

United States Patent [19]
Musschoot

[11] Patent Number: 5,591,074
[45] Date of Patent: Jan. 7, 1997

[54] VIBRATORY TUMBLING APPARATUS WITH REDUCED FORCE TRANSMISSION

[75] Inventor: Albert Musschoot, Barrington, Ill.

[73] Assignee: General Kinematics Corporation, Barrington, Ill.

[21] Appl. No.: 424,188

[22] Filed: Apr. 19, 1995

[51] Int. Cl.$^6$ .......................... B02C 17/14; B24B 31/06; B24B 41/02
[52] U.S. Cl. .......................... 451/328; 241/175; 451/340; 451/113
[58] Field of Search ..................................... 241/175, 201, 241/202, 284; 366/219; 451/32, 35, 36, 104, 113, 326, 328, 340

[56] References Cited

U.S. PATENT DOCUMENTS

| | | | |
|---|---|---|---|
| 3,552,068 | 1/1971 | Van Fossen | 241/175 X |
| 3,637,190 | 1/1972 | Isaacson | 451/326 X |
| 4,164,328 | 8/1979 | Kausel et al. | 241/175 |
| 4,926,601 | 5/1990 | Musschoot | 451/328 X |

FOREIGN PATENT DOCUMENTS

| | | | |
|---|---|---|---|
| 2503845 | 3/1976 | Germany | 451/326 |
| 2638811 | 3/1978 | Germany | 451/326 |
| 591307 | 2/1978 | U.S.S.R. | 451/328 |
| 601140 | 4/1978 | U.S.S.R. | 451/326 |
| 623723 | 9/1978 | U.S.S.R. | 451/328 |
| 975355 | 11/1982 | U.S.S.R. | 451/326 |

*Primary Examiner*—Timothy V. Eley
*Attorney, Agent, or Firm*—Wood, Phillips, VanSanten, Clark & Mortimer

[57] ABSTRACT

A vibratory apparatus is provided and comprises a generally horizontally arranged container having a material supporting surface with means for resiliently mounting the container relative to a support surface. A bracket is resiliently mounted relative to the support surface and is resiliently mounted to the container. A vibration generator means is mounted on the bracket at a location offset on one side of the container. The vibration generator means generating a vibratory force along a linear path offset from the container. Part of the resilient mounting of the container on the support surface and the resilient mounting of the bracket on the support surface and the resilient mounting of the bracket to the container are all variable rate resilient means which can be adjusted to meet certain desired parameters in operating the apparatus. The resilient mounting of the container to the support surface and the resilient mounting of the bracket and vibration generator to the support surface are 180° out of phase which minimizes the transfer of vibratory forces to the support surface.

11 Claims, 2 Drawing Sheets

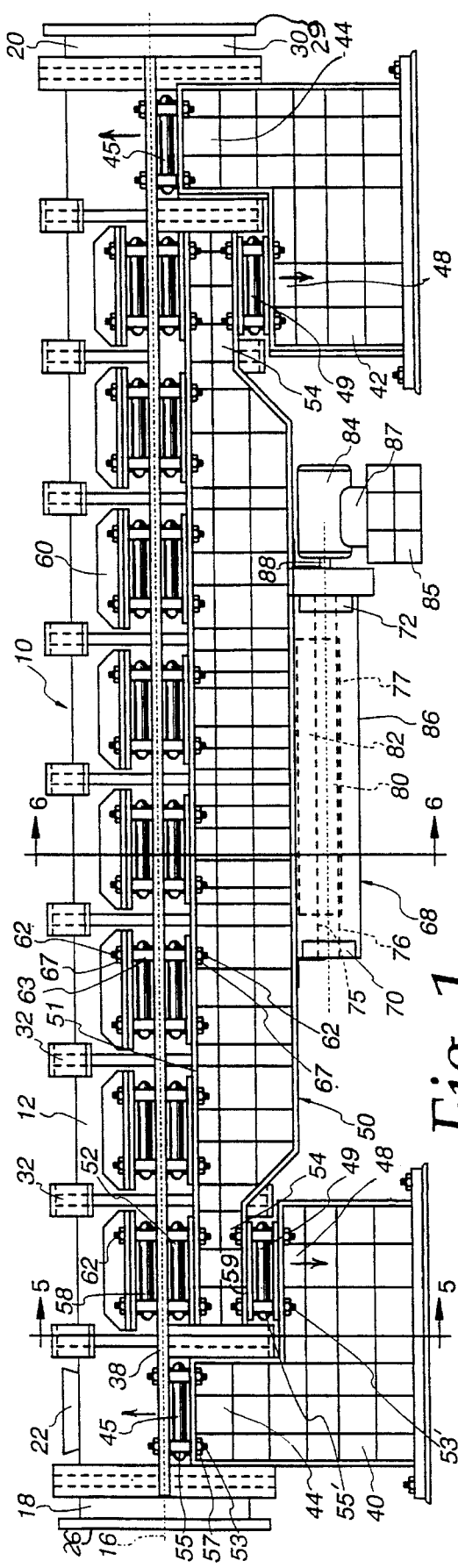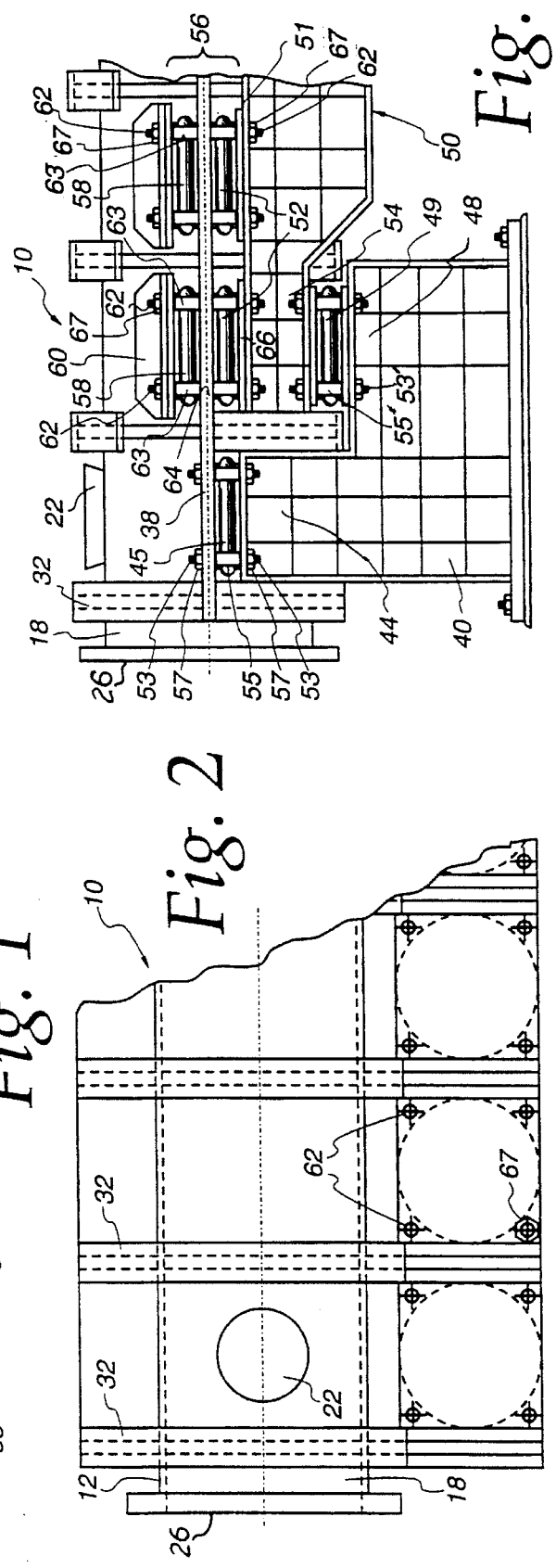

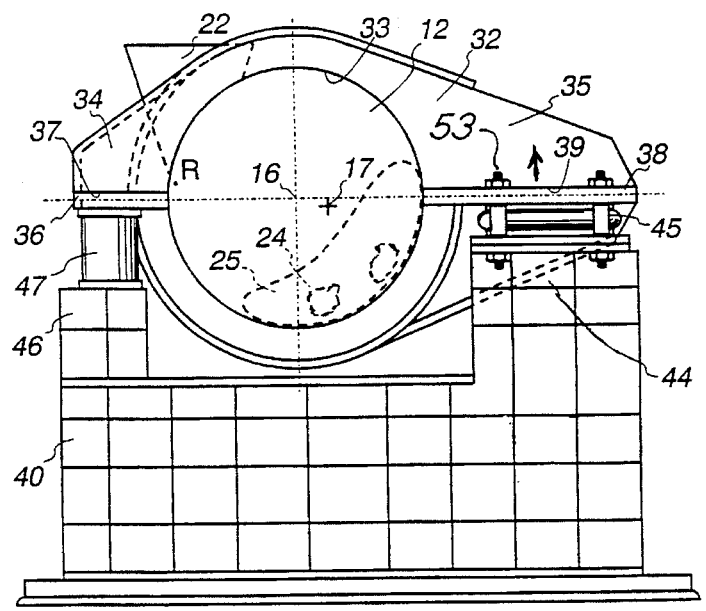
Fig. 4
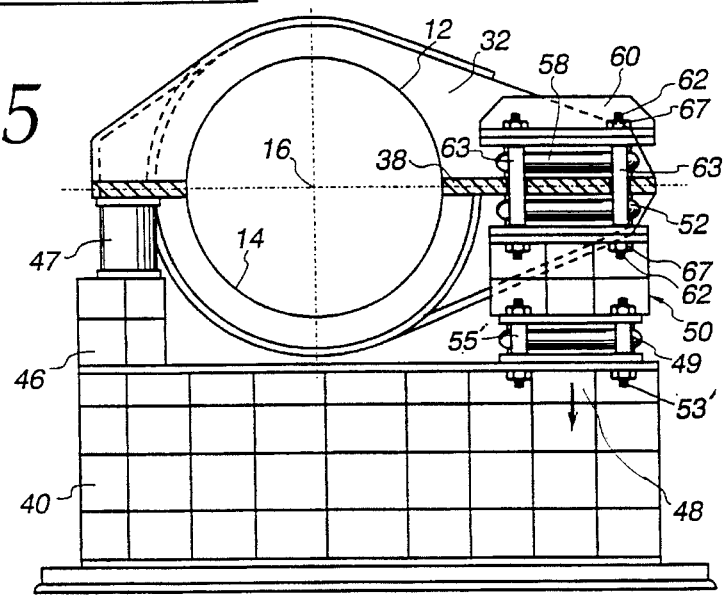
Fig. 5
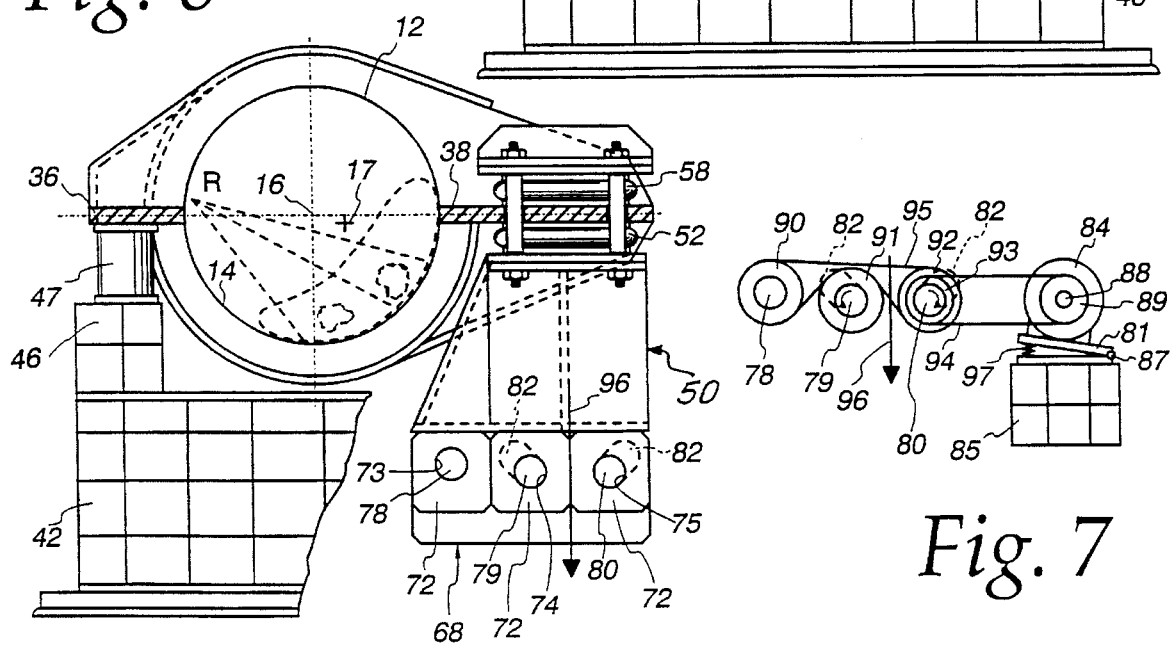
Fig. 6
Fig. 7

VIBRATORY TUMBLING APPARATUS WITH REDUCED FORCE TRANSMISSION

FIELD OF THE INVENTION

This invention relates to material processing apparatus, in particular, to vibratory tumbling machines for grinding aggregate, such as mined ore to reduce the bulky lumps of ore to pellet size. The apparatus can also be used in the foundry industry for cleaning castings, blending granular materials and the like.

THE PROBLEM AND THE PRIOR ART

The use of vibratory motion for grinding, cleaning, blending, mixing, and separating casting from molding media has progressed from the time I first patented a Tiltable Vibrating Burnishing Machine under U.S. Pat. No. 3,157,004, issued Nov. 17, 1964. Vibratory forces were applied to the castings and media using a two-mass system (exciter member and motor as one mass and the container and frame as the second mass) with springs therebetween so that the vibratory forces acted through the container not only to vigorously vibrate the castings and media but also to tumble the castings and media in a generally circulatory motion, thereby grinding, cleaning, polishing and/or burnishing the castings.

To improve upon the tumbling motion of the machine, better balance the machine, reduce wear on the bearings and speed up the process, I patented an improved tumbling apparatus which is covered by U.S. Pat. No. Re. 33,542, reissued Feb. 26, 1991, wherein the vibratory generating apparatus is mounted offset from the longitudinal axis of the container with a linear vibratory force from the vibratory generating apparatus passing external to the container, producing an improved grinding, conveying and tumbling of the parts in the container. The apparatus has proved to be highly efficient, extremely versatile, and commercially successful. However, due to the bulk and weight of the apparatus and the operating parameters of the patented structure, vibrations from the apparatus were transmitted into the supporting structure which created problems in the building containing the apparatus as well as occasionally in adjoining buildings.

THE INVENTION

The present invention is specifically directed to an improved structure that better balances the vibratory forces, reduces vibratory forces transmitted into the ground or supporting structure and reduces the bulk and weight of the apparatus while at the same time permitting a wider range of operating parameters than heretofore.

It has been found that operating apparatus of the type here involved, each piece of which apparatus weighs many tons, produces vibrations into the supporting structure (the building) and thence into the ground. The vibrations sometimes set up waves of vibratory motion through the ground and have been known to join with material frequency vibrations of adjoining buildings to produce, in effect, a giant woofer emitting vibrations within the adjoining buildings which can cause undesirable noises and vibratory sensations. The present apparatus is designed and built in a way to minimize vibrations into the supporting structure, be it the building or the ground around the building.

According to one preferred form of the invention, a container or drum is resiliently mounted relative to a mounting surface on diametrically opposite sides of the container. That is, the container or drum has a short horizontally extending plate on one side resiliently supported by rubber or coil springs carried by the supporting structure or mounting surface. The opposite side of the container or drum has a wide horizontally extending plate radially projecting therefrom and which is trapped between a plurality of pairs of spaced air springs, one spring of each pair of which is supported by an elongated frame member or beam which in turn is supported at its opposite ends on an air spring carried by the supporting structure or mounting surface. Vibration generating means is mounted on the elongate frame member or beam. The air springs supporting the container or drum and the air springs supporting the frame member or beam are 180° out of phase such that a portion of the vibratory force from the vibratory generator is used to provide balance between the air springs supporting the container and the air springs supporting the frame member to reduce vibratory forces transmitted to the ground or to the supporting surface. The use of the air springs reduces the weight of the apparatus while increasing the time between repairs of the equipment and increasing the range of operating parameters for the equipment.

The vibratory generating apparatus may be a two-mass system, a synchronized drive system, a single-eccentric drive system or a brute force system.

Preferred forms of the invention are shown in the accompanying drawings.

BRIEF DESCRIPTION OF THE DRAWINGS

FIG. 1 is a side elevational view showing a preferred form of my vibratory tumbling apparatus;

FIG. 2 is a partial top plan view of the left portion of FIG. 1;

FIG. 3 is a partial enlarged elevational view of my improved vibratory tumbling apparatus shown in FIG. 1;

FIG. 4 is an end elevational view of the apparatus looking at the left end of FIG. 3;

FIG. 5 is a cross-sectional view taken along the line 5—5- of FIG. 1;

FIG. 6 is a cross-sectional view taken along the line 6—6- of FIG. 1 enlarged to correspond to the size of FIGS. 4 and 5; and FIG. 7 is a somewhat schematic illustration of the drive train from the motor to the eccentrics.

DETAILED DESCRIPTION OF THE DRAWINGS

In one preferred form of the invention shown in FIGS. 1–7, a tumbling apparatus 10 is illustrated that can be used for grinding mined aggregate to a reduced particle size, cleaning castings or parts, burnishing and/or polishing castings or parts, shake out of media from castings or parts, mixing and blending granular or powdered material and the like. That is, generally speaking, for processing products with or without a working media.

A unique mounting system employing air springs uses part of the vibratory forces to provide a balance between the drum support and the vibratory generator support which results in less vibrations being transmitted to the floor supporting the apparatus or to the ground.

The tumbling apparatus 10 comprises a container 12 which is illustrated as cylindrical but could be square or rectangular having a curved but not necessarily circular material supporting surface 14 as shown in FIGS. 4, 5, and 6. The cylindrical container or drum 12 has a longitudinal axis 16 which is illustrated in FIG. 1 as being level but it could be pitched down slightly from an inlet end portion 18 to an outlet end portion 20 to decrease the elapsed time the lumps of mined ore, a casting and/or media remain in process in the container. The inlet end portion 18 has an inlet port or opening 22 through which material 24 and 25 to be processed can be dumped into the container. In a slightly modified form of apparatus an inlet opening (not shown) can be located in the end wall 26 of the container or in the side wall of the container through which opening a conveyor (not shown) can feed the material 24 and 25 into the container. In one preferred use of the apparatus the material being processed is mined aggregate made up of lumps of ore 24 and rock, dirt and/or sand 25. In another preferred use of the apparatus, the materials being processed are castings, neither of which is shown and molding media.

The material being processed, ore 24 or castings 24' and some rock 25, will exit the container through a discharge opening or part (now shown) in the end wall 29 through a discharge opening or port (not shown) in the longitudinal side wall 30 of the container near the downstream end of the container. In practice a conveyor, not shown, will interact with the discharge opening or port 28 to receive the processed material and to transport same to the next station. The dirt and some rock 25 and/or sand 25' is discharged from appropriate openings near the exit end portion of the container.

The container 12 has a plurality of ribs or plates 32 transversely oriented relative to the longitudinal axis of the drum and equally spaced along the length of the container. Each rib or plate 32, as best illustrated in FIGS. 3, 4, 5 and 6, has a generally circular upper and lower edge and has a cutout central portion 33 attached, as by welding, to the outer surface of the container, with a short flange 34 projecting outward or rearward on one side and a long or wide flange 35 projecting outward or forward on the opposite side. An elongate radially directed support plate 36 is attached to one side of the container and to the bottom edge 37 of each short flange 34 of each transverse rib or plate 32. In a similar fashion only of a wider radial extent is an elongate radially directed support plate 38 attached to the opposite longitudinal side of the container and to the bottom edge 39 of each forwardly projecting long or wide flange 35 of each transverse plate 32. The support plates 36 and 38 are preferably aligned with each other and with the longitudinal axis of the container and lie in a common plane.

A pair of longitudinally spaced supports 40 and 42 are set on a supporting surface such as on the ground or on a factory floor. Each support 40, 42, as shown, is three-tiered 44, 46 and 48, with each tier 44 supporting an air spring 45 which in turn supports the wide support plate 38 of the container, with each tier 46 supporting coil or rubber springs 47, see FIGS. 4, 5 and 6, which, as shown, are rubber springs but could be any type of spring supporting the short support plate 36, and with each tier 48 supporting an air spring 49 which in turn supports one end of a beam or bracket 50 which beam or bracket carries plural air springs 52, 58 in engagement with the wide support plate 38. As best seen in FIG. 3, bolts 53 pass through plate 38 and the top of tier 44 with a spacer 55 around the bolt 53 between plate 38 and the top ledge of the tier 44 such that a predetermined preload is placed on each air spring 45 when nuts 57 are tightened on the bolts 53. Likewise, similar bolts 53' pass through bottom wall 59 on the bottom surface of the end portions 54 of the bracket or beam 50 and pass through the top ledge of the tier 48 with a spacer 55' surrounding the bolts 53 between the bottom wall 59 of the bracket and the top ledge of tier 48 such that a predetermined preload is placed on each air spring 49. The significance of the air spring support structure will be described more in detail hereinafter.

As can now be seen, FIGS. 4, 5, 6, the tiers 46 of supports 40,42 support the container, at the rear or one side, by means of the rubber or coil springs 47 supporting the plate 36 and, tiers 44 of supports 40, 42 supports the container at the front or other side, by means of the air springs 45 supporting the plate 38. That is, the container 12 is resiliently supported front and rear and at the inlet end portion and outlet end portion by rubber or coil springs 47 acting through plate 36 and flange 34 and air springs 45 acting through plate 38 and flange 35. The plural transverse ribs or plates 32 affixed as by welding to the container or drum and to the plates 36 and 38 provides a rigid structure upon which the container is supported.

The elongate beam or bracket 50 extends substantially the length of the container between the tiers 48 of the supports 40,42. The beam or bracket 50 is rigid and has a flat top wall 51 and reduced thickness offset end portions 54 with a bottom wall 59 supported on the air springs on the tiers 48 of the supports 40 and 42. Between the top wall 51 of bracket or beam 50 and the wide support plate 38 of the container are plural air springs 52. Each air spring 52 is part of a spring couple 56 outlined with a bracket in FIG. 3 with a second matching air spring 58 supported on the upper surface of the wide bracket or beam 38. As best shown in FIGS. 3 and 5, a cap 60 is seated on the air spring 58 with four tie rods 62 passing through the cap, through enlarged openings 64 in the wide support plate 38 and through a backing plate 66 and wall 51 of the bracket 50, the plate 66 is positioned between the air spring 52 and wall 51 of the beam or bracket 50. A spacer 63, in the form of a pipe, surrounds each tie rod 62 and is of a predetermined length such that when nuts 67 are threaded on the ends of the tie rods 62 and tightened, the cap 60, backing plate 66 and wall 51 of bracket 50 bear against the ends of the spacers 63 to compress the air springs 58 and 52 against the opposite sides of the wide support plate 38 a predetermined amount. The degree of compression of the air spring couples 56 will be determined by the ultimate vibratory motions to be provided to the drum and its contents. The means by which the degree of compression of the air spring couples 26 can be altered constitute a means for varying the spring rate to tune the vibratory force to residence for each vibratory force setting on the vibration generator to be described hereinafter.

Suspended from the beam or bracket 50 is the vibration generating apparatus 68 best illustrated in FIGS. 1, 6 and 7 and includes spaced apart supports 70 and 72 connected to the bottom wall 59 of the beam 50. The supports as shown have three spaced apart side by side apertures 73,74,75 rotatably supporting the opposite end portions 76,77 of rotatable shafts 78,79,80. Each shaft 79 and 80 has an elongated eccentric weight 82 affixed thereto. The eccentric weights 82, 82 are driven in opposite directions whereupon they will synchronize to produce the desired vibratory motion.

A drive motor 84, see FIG. 1 and the schematic showing in FIG. 7, is mounted on a plate 81 which is pivoted at hinge 87 to a platform 85 carried by the mounting surface. The motor 84 drives a shaft 88 upon which is fixed a pulley 89. Each shaft 78, 79 and 80 has a pulley 90, 91 and 92, respectively, affixed to one end portion thereof. Pulleys 91 and 92 are of the same diameter and the axes of the shafts 79 and 80 lie in a common plane substantially parallel to the mounting surface. A second pulley 93 is mounted on the shaft 80 in alignment with the pulley 89 on the motor such that a belt 94 encircles pulleys 89 and 93 and drives the pulley 93, along with driving pulley 92 and shaft 80. The axis of the idler shaft 78 is positioned slightly above the plane of the axes of the shafts 79 and 80 such that the pulley 90 on the shaft 78 has a tangent to its uppermost portion spaced above a tangent to the upper most portion of pulley 91. A belt 95 circles pulley 92 on shaft 80 with the lower reach of the belt passing in contact with the top of pulley 91, encircles pulley 90 from below and passes above and out of contact with pulley 91 as it passes directly back to and around pulley 92. As the motor drives the pulleys, shafts 79 and 80 with their associated eccentrics 82, 82 are driven in opposite directions. The eccentrics will synchronize producing a linear vibratory force 96 passing external of the container or drum. The pivoted plate 81 supporting the motor 84 is resiliently restrained as by tension spring 97 against pivoting about hinge 87 so that the motor can pivot a controlled amount to maintain drive tension on the belt during start up or during uneven loading conditions.

In operation, the motor 84 is activated to drive the eccentrics 82 to set up a vibratory force which is linear and in a substantially vertical direction relative to the mounting surface upon which the apparatus is mounted. Due to the relative locations of the air springs 45 and 49 and the vibratory action from the generating apparatus 68, the forces acting on air spring 45 will be 180° out of phase with the forces acting on air spring 49 such that part of the generated vibratory force is being used to provide a balance between air spring 45 and air spring 49. In this way less vibration forces are transmitted to the building or ground supporting the apparatus. The reduction in vibration forces to the building or ground reduces noise generated by the vibrations.

The air springs may be of the type made and sold by Firestone Tire and Rubber Company under the trademark Airstroke Springs®. The degree of tightening of the tie rods on air springs 52 and 58 as determined by the lengths of the spacers 63 together with the amount of air pressure admitted to the air springs will determine the stroke and amplitude of the vibrations administered to the container. The amount of air admitted to the air springs is provided by appropriate controls and pumps of a well known type generally supplied with or recommended by the manufacturer of the air springs. The vibratory forces being substantially vertical will produce a vibratory tumbling action in the container somewhat along the lines described in my Reissued U.S. Pat. No. 33,542 dated Feb. 26, 1991. The difference being that due to the ability to control the spring rate, stroke and amplitude of the vibratory action will provide a wide range of operating parameters depending on the work being performed with the apparatus. For instance, different sets of operating parameters are needed for reducing the size of lumps of mined ore or tocanite, for shaking out sand from a casting or for tumbling castings to grind or to polish the castings.

In the iron ore or taconite industry, the ore, i.e., iron ore, is extracted from the earth in chunks or lumps embedded in rock. The chunks or lumps of ore and rock are crushed into golf ball sized, baseball sized and/or fist sized aggregate or composite material which may also include dirt and sand. The aggregate or composite material when dumped into the container or drum 12 is subjected to vibratory forces which tumbles the aggregate causing the various elements of the aggregate to abrade and grind the elements reducing the size of the members gradually until the aggregate consists of pellet sized balls of ore, together with rock and sand. The fines or small rocks and sand are discharged continuously and the pellet sized ore and rock are expelled onto an exit conveyor. Magnets are used to separate the pellets of ore (taconite) from the inert rock and sand that followed the pellets out the discharge. The vibratory apparatus ground and separated the rock and ore and reduced by grinding the ore to pellet size needed for use in the iron and steel industry.

To accomplish the grinding needed to reduce the aggregate to pellet or taconite size in a practical manner, the vibratory apparatus needed heavy duty springs between the vibratory generator and the drum. It would require literally additional tons of weight in springs alone to provide the force required. The springs would fail after relatively short use requiring expensive and difficult maintenance to replace the springs. Using the air springs makes it possible to reduce the weight per machine by thousands of pounds. The air springs have much longer life and if replacement is needed, it is relative quick and inexpensive. The air springs make it possible to provide a degree of stiffness to the spring action that is almost impossible to obtain with conventional coil springs.

With the linear vibratory forces acting external of the drum 12 along the line 96, which is on the side of the center of gravity 17 remote from the longitudinal axis 16 of the drum or container 12, each point on the surface 14 of the drum is caused to rotate along a path lying on a segment of a circle. Each of said segments of a circle has a somewhat common center of rotation R generally designated 19 located at a position displaced from the longitudinal axis 16 and on the side of axis 16 remote from the center of gravity 17 so that segments of circles do not conform to the curved material supporting surface. The springs 45 and 47 mount the container or drum 12 for unconstrained vibratory movement. The drum or container 12 is usually slightly tilted downward from the inlet end to the discharge end so as to facilitate movement of the material through the drum and out the discharge.

By varying the spring rate of the air springs 52, 58 and by varying vibratory forces 96 generated by the vibration generator 68, a desired tumbling action in the drum 12 can be attained to suit the treatment desired on the article being treated.

I claim:

1. A vibratory system comprising:

a generally horizontally arranged container having a material supporting surface, said container having a longitudinal axis extending from an inlet end to a discharge end;

means having a spring rate for resiliently mounting said container relative to a mounting surface;

vibration generator means mounted on said container at a location offset on one side of the longitudinal axis of the container, said vibration generator means generating a vibratory force along a linear path offset from the longitudinal axis;

a bracket means;

means resiliently mounting said bracket means relative to a mounting surface;

resilient means acting between said bracket means and said container for transmitting said vibratory forces from said vibration generator means and said bracket means to said container; and means for varying the spring rate of said resilient means for varying the vibratory forces acting on said container.

2. A vibratory system as claimed in claim 1 wherein said means for resiliently mounting said container relative to the mounting surface and said means for resiliently mounting said bracket means relative to the mounting surface are vibrating 180° out of phase when said vibration generated means is vibrating said container whereby vibratory forces transmitted to the mounting surface are minimized and a balanced vibratory apparatus is produced.

3. A vibratory apparatus comprising:

a generally horizontally supported container having a curved material supporting surface, said container having a longitudinal axis extending from an inlet end to a discharge end;

mounting means for resiliently mounting said container relative to a support means; said mounting means comprising resilient means on one side and variable rate resilient means on the other side of said container, both the resilient means and variable rate resilient means bearing on said support means;

bracket means resiliently mounted on variable spring rate resilient means on said support means at a location offset on one side of the longitudinal axis of the container;

vibration generator means carried by said bracket means and producing liner vibratory forces exterior of said container for vibrating said container and contents;

means for varying the vibratory force generated by the vibration generator means; and means for varying the spring rate of said variable spring rate resilient means to tune the vibratory force to resonance for each vibratory force setting on said vibration generator means, whereby materials and media introduced into said container will be tumbled and rolled as they advance through the container.

4. A vibratory apparatus as claimed in claim 3 wherein said variable rate resilient means between the container and the support means and between the bracket means and the support means are air springs connected to air pressure means for varying the spring rate of each air spring.

5. A vibratory apparatus as claimed in claim 4 wherein said air springs between the container and the support means are vibrating 180° out of phase with the air spring between the bracket means and the support means whereby the vibratory forces from the vibration generator means balances between said first named air spring and the second named air spring to reduce vibratory forces to the support means.

6. A vibratory apparatus comprising:

a generally horizontally arranged container having a material supporting surface, said container having a longitudinal axis extending from an inlet end to a discharge end;

means for resiliently mounting said container relative to a support means;

bracket means resiliently mounted on said support means;

vibration generator means mounted on said bracket means at a location offset on one side of the longitudinal axis of the container, said vibration generator means comprising shaft means disposed substantially parallel to the longitudinal axis, eccentric weight means carried by the shaft means, a motor rotating the shaft means and eccentric weight means to generate a vibratory force along a linear path offset from the longitudinal axis;

variable spring rate resilient means mounted between said bracket means and the container; and means for varying the spring rate of said variable spring rate resilient means whereby the vibratory forces acting on said container are adjusted by adjusting the spring rate of said variable spring rate resilient means.

7. A vibratory apparatus comprising:

a generally horizontally arranged container having a material supporting surface, said container having a longitudinal axis extending from an inlet end to a discharge end;

resilient means mounting one side of said container relative to a support means and variable rate resilient means mounting the other side of said container relative to the support means;

bracket means resiliently mounted relative to the support means, said resilient mounting comprising variable rate resilient means between opposite ends of said bracket means and the support means;

variable spring rate resilient means positioned between said bracket means and said other side of said container;

vibration generator means mounted on said bracket means at a location offset on said other side of the container, said vibration generator means comprising shaft means disposed substantially parallel to the longitudinal axis, eccentric weights carried by the shaft means, a motor rotating the shaft means and eccentric weights to generate a vibratory force along a linear path offset from the longitudinal axis; and means for varying the spring rate of said variable spring rate resilient means to vary the spring rate of said resilient means for varying the vibratory forces acting on said container.

8. A vibratory apparatus comprising:

a generally horizontally arranged container having a curved material supporting surface, said container having a longitudinal axis extending from an inlet end to a discharge end;

mounting means for resiliently mounting said container relative to a support surface at a particular spring rate;

bracket means resiliently mounted on said support surface at a particular spring rate;

vibration generator means mounted on said bracket means at a location offset on one side of the longitudinal axis of the container, said vibration generator means comprising plural shaft means disposed substantially parallel to each other and to the longitudinal axis of the container, a pulley on the end of each of two adjacent shaft means, an eccentric weight carried by the two adjacent shaft means, an idler pulley on a third shaft means offset from said two adjacent shaft means, a belt partially encircling a first one of said pulleys, wrapped over the second of said pulleys, wrapped around the idle pulley and passing back to the first pulley, a motor rotating the first shaft and pulley to rotate the two adjacent shaft means and eccentric weights in opposite directions to produce a linear force offset from the longitudinal axis;

means for resiliently mounting said bracket means on said container; and means for varying the spring rate of each of said means for resiliently mounting said bracket means to vary the vibratory forces acting on said container.

9. In a vibratory apparatus comprising:

a generally horizontally arranged container having a curved material supporting surface, said container having a longitudinal axis extending from an inlet end to a discharge end;

mounting means for resiliently mounting said container relative to a support surface, a first part of said mounting means comprising spring means for supporting one side of the container, a second part of said mounting means comprising spring means having a variable rate for supporting the diametrically opposite side of said container;

bracket means located offset from said opposite side of said container and having first resilient means for resiliently supporting said bracket means relative to said support surface, second resilient means carried by said bracket means for resiliently supporting said container, said first and said second resilient means comprising air spring means having means for varying the spring rate of said air spring means; and vibration generator means mounted on said bracket means, said vibration generator means generating a vibratory force along a linear path offset from the longitudinal axis of the container.

10. In a vibratory apparatus as claimed in claim 9 wherein said air spring means supporting said opposite side of the container and said air spring means supporting said bracket means and said vibration generating means are vibrating 180° out of phase so that a portion of the vibratory force generated by the vibration generating means is used to neutralize the vibratory forces normally transmitted to the support surface.

11. In a vibratory apparatus comprising:

a generally horizontally arranged container having a curved material supporting surface, said container having a longitudinal axis extending from an inlet end to a discharge end of the container;

mounting means for resiliently mounting said container relative to a support surface, a first part of said mounting means comprising spring means having a fixed spring rate for supporting one side of the container, a second part of said mounting means comprising air spring means having a variable spring rate for supporting the diametrically opposite side of said container;

bracket means located offset from said opposite side of said container and having resilient means for resiliently supporting said bracket means relative to said support surface, second resilient means carried by said bracket means for resiliently supporting and operatively engaging with said container, said first named resilient means and said second resilient means comprising air spring means having means for varying the spring rate of said air spring means;

vibration generator means mounted on said bracket means, said vibration generator means comprising shaft means disposed substantially parallel to the longitudinal axis of the container, an eccentric weight carried by said shaft means, a motor rotating said shaft means and said eccentric weight for generating a vibratory force along a linear path offset from the longitudinal axis of the container; and whereby said air spring means supporting said opposite side of the container and said air spring means supporting said bracket means and said vibration generating means are 180° out of phase so that a portion of the vibratory force generated by the vibration generating means is used to provide a balance therebetween.

\* \* \* \* \*